United States Patent Office 3,792,023
Patented Feb. 12, 1974

---

3,792,023
PROCESS FOR THE PRODUCTION OF STORAGE-STABLE POLYURETHANE ISOCYANATES
Lothar Havenith, Dietrich Liebsch, and Joachim Zirner, Leverkusen, Germany, assignors to Bayer Aktiengesellschaft, Leverkusen, Germany
No Drawing. Continuation-in-part of abandoned application Ser. No. 30,985, Apr. 22, 1970. This application June 23, 1972, Ser. No. 265,907
Claims priority, application Germany, May 3, 1969, P 19 22 626.7
Int. Cl. C08g 22/16
U.S. Cl. 260—77.5 AQ    4 Claims

ABSTRACT OF THE DISCLOSURE

A process is provided for the production of polyurethane isocyanates which are stable on storage, which dry quickly in the presence of atmospheric moisture and which contain tertiary nitrogen atoms by reacting aromatic diisocyanates or polyisocyanates with polyether alcohols with an NCO/OH ratio of at least 1.57, wherein the polyether alcohols used are of the kind which contain at least one tertiary nitrogen atom with at least five and preferably more than ten ether groups between the tertiary nitrogen atom and the hydroxyl group.

---

This application is a continuation-in-part of copending application No. 30,985, filed on Apr. 22, 1970, and now abandoned.

The preparation of isocyanate containing polyurethane prepolymers which are soluble in suitable organic solvents and which harden to form insoluble layers by reaction with atmospheric moisture following application to substrates such as wood, metal or stone is known.

Conventionally, single-component systems which must be stable enough in storage to be shelved or further processed harden very slowly over a period of several hours, and hardening is greatly influenced by the moisture in the atmosphere. Although it is possible to obtain quicker drying in cases where products of relatively high molecular weight are used with atmospheric moisture or by adding catalysts to increase the velocity of the reaction, the stability of such materials on storage is so poor that the materials often gel within a matter of weeks even in tightly sealed containers, and form highly polymeric insoluble masses which can no longer be used.

It is therefore an object of this invention to provide storage-stable polyurethane compositions which dry quickly on contact with atmospheric moisture and a process for preparing them which are devoid of the foregoing disadvantages.

Another object of this invention is to provide coatings prepared from one-component polyurethane isocyanates which dry quickly on any kind of substrate without the need of catalysis.

Yet another object of this invention is to provide a one-component polyurethane isocyanate that will harden to a completely bubble free finish, even when applied in thick layers.

A further object of this invention is to provide polyurethane isocyanate one-component coating systems which can be reliably processed even if considerable fluctuations in atmospheric conditions occur.

A still further object of this invention is to provide one-component polyurethane based coatings which have a very low sensitivity to solvents normally used in lacquer systems, even shortly after application.

Yet a further object of this invention is to provide polyurethane based isocyanates which possess a sufficiently high level of reactivity to preclude the need for using catalysts, but which are nevertheless extremely stable on storage even in low percentage solution.

The foregoing objects and others which will become apparent from the following description are accomplished in accordance with this invention, generally speaking, by providing one-component polyurethane based isocyanate systems which are stable on storage and contain tertiary nitrogen atoms and which are prepared by a process which comprises reacting an aromatic polyisocyanate with a polyether containing hydroxyl groups and at least one tertiary nitrogen atom and having at least 5 ether groups between the tertiary nitrogen atom and the hydroxyl groups, said aromatic polyisocyanate being a prepolymeric polyurethane or allophanate containing free isocyanate groups and having a molecular weight below about 1000 obtained by reacting aromatic polyisocyanates free of urethane and allophanate groups with polyols which are free of nitrogen, the NCO/OH ratio referring to the NCO groups of the aromatic polyisocyanate free of urethane and allophanate groups and to the hydroxyl groups of the polyether containing tertiary nitrogen as well as to the hydroxyl groups of the polyol which is free of nitrogen being at least 1.57.

It has now been found that one-component systems which are stable on storage and which dry quickly by reaction with atmospheric moisture can be obtained by reacting suitable prepolymers containing isocyanate groups with polyethers containing hydroxyl groups and tertiary nitrogen atoms in such a way that the polyurethanes thus obtained contain free isocyanate groups and are soluble in inert polar organic solvents.

Polyethers containing hydroxyl groups and tertiary nitrogen atoms have been described in DAS 1,288,216 and 1,283,422. These referenecs teach the use of such compounds as constituents of two-component polyurethane lacquers and make it clear that in order to function for such a purpose they must be mixed with suitable isocyanates just before application and must be processed immediately because they have an extremely short pot-life. The extremely fast reactivity of these materials is due to the fact that their tertiary nitrogen atoms catalyze the formation of polyurethanes. Thus, the component containing isocyanate groups and the component containing tertiary nitrogen and hydroxyl groups must be kept separate from one another up to the processing stage.

Accordingly, it must be regarded as both surprising and advantageous that, by virtue of the process of this invention, it is now possible to obtain polyurethanes containing isocyanate groups which, despite the presence of tertiary nitrogen atoms in the molecule, are still stable on storage.

The new polyurethane isocyanates obtained by the process of this invention may be used as binders or vehicles in one-component paint systems. Coatings prepared from the new polyurethane isocyanates of this invention dry quickly on any kind of substrate and even when applied in thick layers, harden completely free from bubbles. It is surprising that, unlike conventional systems, the drying and hardening rate of the coatings of this invention are governed only to a very limited extent by the relative humidity. Accordingly, the systems of this invention can be reliably processed even if considerable fluctuations in atmospheric conditions occur.

It is also surprising that the coatings prepared with the products of the process of this invention are remarkably hard even shortly after application. The sensitivity of the coatings of this invention to the solvents normally used in the lacquer industry is noticeably low even shortly after they have been applied, unlike conventional one- or two-component polyurethane lacquers.

In addition, by virtue of the high level of reactivity of the products of this invention, there is no need to use the catalysts in the lacquer system which would otherwise be necessary.

However, despite the advantage of high reactivity, the products of the process of this invention are extremely stable on storage and can be stored for several months in firmly sealed containers without any appreciable increase in their viscosity even in low-percentage solution. This is highly surprising since it is well known in the art that tertiary nitrogen atoms catalyze all kinds of reactions of isocyanate groups with active hydrogen atoms including e.g. the reaction between isocyanate groups and active hydrogen atoms of urethane linkages. It had for this reason to be expected that prepolymers containing free isocyanate groups, urethane groups and tertiary nitrogen atoms would not be storage-stable as are the corresponding prepolymers which do not contain tertiary nitrogen atoms.

In the process of this invention, it is possible to use any aromatic polyisocyanate being a prepolymeric polyurethane or allophanate containing free isocyanate groups and having a molecular weight below about 1000. These specific aromatic polyisocyanates are obtained from aromatic polyisocyanates such as for example 1,3- and 1,4-phenylene diisocyanate, 2,4- or 2,6-tolylene diisocyanate and mixtures of these isomers, 2,4'- and 4,4'-diphenyl methane diisocyanate and mixtures of these isomers, 2,2'-bis-(4-isocyanato phenyl)-propane, 4,4'-diisocyanato diphenyl ether, 4,4',4''-triisocyanato triphenyl methane, thiophosphoric acid triphenyl ester-4,4',4'''-triisocyanate or mixed aliphatic-aromatic polyisocyanates including any aromatic polyisocyanate disclosed in Canadian Pat. 698,636 or mixtures thereof and polyalcohols such as for example 1,2-propylene glycol, 1,3- or 1,4-butane diol, 1,6-hexane diol, glycerol, 1,1,1-trimethylol propane, and hexane triol. The prepolymeric polyurethane and allophanates containing isocyanate groups are obtained by reacting an excess of above-mentioned aromatic polyisocyanates wtih the polyalcohols. The excess monomeric isocyanate can be removed from the polyurethane or allophnates containing isocyanate groups by distillation or extraction.

In the practice of this invention polyether alcohols that contain a tertiary nitrogen atom and have at least five and preferably ten ether groups between the reactive hydroxyl groups and the nitrogen atom can be used as the hydroxyl containing compound.

Some such suitable hydroxyl compounds include the alkoxylation products of ammonia and aliphatic amines which have from one to three nitrogen atoms in the molecule and at least two but preferably three or four hydrogen atoms bound to nitrogen atoms, and in which one or more nitrogen atoms may also form a part of a heterocyclic ring. The alkoxylating reactant is preferably an epoxide, having 2-4 carbon atoms. The alkoxylation products of hydrazine and aliphatic mono- or dihydrazines containing at least two hydrogen atoms bound to a nitrogen atom may also be used.

Some specific examples include the ethoxylation, propoxylation and butoxylation products of butyl amine, cyclohexyl amine, piperazine, ethylene diamine, N,N'-dimethyl ethylene diamine, stearyl amine, methyl-bis-(3-aminopropyl)-amine, methyl hydrazine and symmetrical and asymmetrical dimethyl hydrazine.

The nitrogen-containing hydroxyl compounds used in the practice of this invention have preferably an average molecular weight not exceeding about 10,000. It is particularly preferred to use polyalcohols having molecular weights of from about 2000 to about 5000. This statement does however not exclude the fact that hydroxyl compounds having a molecular weight exceeding 10,000 may also be used.

The reaction between the isocyanate and the nitrogen-containing hydroxyl compound is preferably carried out in a suitable lacquer solvent such as an ester, ketone or chlorinated hydrocarbon having a water content of less than about 0.1 percent and preferably less than about 0.05 percent. Suitable solvents are e.g. methylene chloride, trichloro ethylene, toluene, xylene, ethyl acetate, propyl acetate, butyl acetate, amylacetate, isobutyl acetate, methyl ethyl ketone, methyl isobutyl ketone, methoxy butyl acetate, ethyl ethylene glycol ether acetate and mixtures of such solvents.

The process of the invention is advantageously carried out in a one-pot process in which the aromatic polyisocyanates free of urethane allophanate groups are successively reacted with the polyalcohols free of nitrogen and then the polyether alcohols containing tertiary nitrogen atoms. In a preferred embodiment of the process of the invention the polyisocyanates containing urethane and allophanate groups are prepared in situ in the course of the process of the invention by reacting the aromatic polyisocyanates with a mixture of above polyalcohols free of nitrogen and the polyether alcohol containing tertiary nitrogen atoms. In this case mixtures of the nitrogen containing polyether alcohols with 0–80, preferably 0–40 percent by weight based on the total amount of alcoholic components are applied.

The reaction may be carried out at a temperature of from about 20° to about 120° C. and preferably at a temperature of from about 60° to about 100° C.

The quantitative ratio of isocyanate to hydroxyl groups referring to the NCO groups of the aromatic polyisocyanate free of urethane and allophanate groups and to the hydroxyl groups of the polyol which is free of nitrogen should not be less than NCO/OH≧1.57.

Whether or not they contain pigments, dyes or other additives, the products of the process of this invention are valuable starting materials for the production of lacquers which have outstanding properties compared to conventional starting materials as enumerated herein.

The invention is further illustrated but is not intended to be limited by the following examples in which all parts and percentages are by weight unless otherwise specified.

EXAMPLE 1

About 200 parts of 2,4-tolylene diisocyanate are dissolved in about 195 parts of xylene and about 162 parts of ethyl glycol ether acetate and the resulting solution is introduced into a reaction vessel equipped with a thermometer, a stirring mechanism and a reflux condenser. A mixture of about 51 parts of trimethylol propane and about 123 parts of ethyl glycol ether acetate is heated to around 80° C. and slowly added dropwise to this solution. The reaction mixture is then kept at around 70° C. for about 50 minutes following the addition. Thereafter, a mixture of about 150 parts of a tetrahydroxy polyether having a molecular weight of about 3700 (OH number 60) and obtained by the propoxylation of ethylene diamine, in about 100 parts of ethyl glycol ether acetate is added dropwise. On completion of the addition, the reaction mixture is kept at about 70° C. for about two hours. The NCO/OH ratio referring to all isocyanate groups and all hydroxyl groups in this example is 1.77. The lacquer solution thus obtained has a resin content of about 40 percent and an NCO content of about 4 percent. Immediately after preparation the lacquer solution has a viscosity of about 100 cp.; after about twenty weeks' storage the lacquer solution has a viscosity of 191 cp.

EXAMPLE 2

About 10 parts of a tetrahydroxy polyether having a molecular weight of about 3700 (OH number 60) and obtained by the propoxylation of ethylene diamine are diluted with about 41.5 parts of a mixture of about 1 part by volume each of ethyl glycol ether acetate, ethyl acetate, butyl acetate and toluene, followed by the addition of about 30 parts of about a 75 percent solution in ethyl acetate of an isocyanato urethane which is the reaction product of 3 mols of 2,4-diisocyanato toluene with 1 mol of 1,1,1-trimethylol propane. The NCO/OH ratio referring to the NCO groups of the unreacted 2,4-diisocyanatotoluene and the hydroxyl groups of trimethylol propane as well as of the tetrahydroxy polyether amounts to 1.83.

The mixture is kept at about 60° C. for between seven and eight hours after which the formation of the prepolymer is complete and the NCO content falls to 4.2 percent. After forty weeks' storage, the 40 percent lacquer solution has a viscosity of only 550 cp. The initial viscosity was 452 cp.

EXAMPLE 3

About 375 parts of an isocyanato urethane prepared by reacting 2,4-tolylene diisocyanate with trimethylol propane as described above which is free of monomeric isocyanate dissolved in a solution of ethyl glycol ether acetate and xylene 1:1 with a solids content of about 67 percent are diluted with about 275 parts of a mixture of about one part by volume of xylene and one part by volume of ethyl glycol ether acetate and heated to about 60° C. in a sealed reaction vessel equipped with a stirring mechanism, a reflux condenser and a thermometer. At this temperature, a mixture of about 200 parts of ethyl glycol ether acetate and about 150 parts of a tetrahydroxy polyether having a molecular weight of 3700 (OH number 60) and obtained by propoxylating ethylene diamine, is added dropwise over a period of around one hour. The NCO/OH ratio referring to the NCO groups of the unreacted 2,4-diisocyanatotoluene and the hydroxyl groups of trimethylol propane as well as of the tetrahydroxy polyether amounts to 1.75. The reaction temperature should be between about 50 and 70° C. After the total quantity has been added, the temperature is increased to about 80° C. and the reaction mixture left standing at this temperature for a period of about two hours. If necessary, the reaction may also be completed at normal temperature in which case, after a reaction time of some seven days at room temperature in a sealed vessel, the NCO content of the reaction mixture has fallen to around 3.6 percent and prepolymerization is substantially complete.

The one-component system thus prepared has a resin content of about 40 percent, a viscosity of about 90 cp. and an NCO content of 3.5 percent. After an initial increase in viscosity to 180 cp., the viscosity remains substantially constant for another forty weeks in a sealed vessel.

If necessary, levelling agents such as silicone oil or cellulose acetobutyrate, for example, may be added to the prepolymers.

Comparison single-component lacquer A

About 268 (2 mols) of trimethylol propane, about 90 parts (1 mol) of 1,3-butane diol and about 956 parts (1 mol) of a polypropylene glycol having an OH number of 3.2 percent and a molecular weight of around 1000 are dissolved with gentle heating in about 1812 parts of a mixture of about 1 part of xylene and about 1 part of ethyl glycol ether acetate in a reaction vessel of the kind described in Example 1. About 1392 parts of 2,4-tolylene diisocyanate (NCO/OH ratio 1.6) are slowly added dropwise with stirring to the mixture after it has been heated to around 50° C. The reaction temperature should not exceed 60° C. On completion of the addition, the mixture is kept at about 80° C. for another three hours. After cooling, the prepolymer containing about 60 percent of solid resin is diluted with 1:1 xylene/ethyl glycol ether acetate to a binder content of about 40 percent in order to prepare the paints and films. The 40 percent lacquer solution has an NCO content of 3.5 percent.

Comparison component lacquer B

About 100 parts of an hydroxyl-containing polyester of diethylene glycol and adipic acid (OH number 42) are diluted with about 128 parts of ethyl glycol ether acetate, about 43 parts of butyl acetate, about 100 parts of xylene and about 15 parts of methoxy butyl acetate, followed by the addition of about 20 parts of a 20 percent solution of a copolymer of polyvinyl acetate and polyvinyl chloride dissolved in ethyl glycol acetate and cyclohexanone (3:1 parts by volume) in order to adjust to optimum viscosity. About 230 parts of a solution of a TDI-free isocyanate urethane prepared by reacting of tolylene diisocyanate with trimethylol propane as described above in a solution of ethyl glycol ether acetate and xylene 1:1 with a solids content of 67 percent is then added, after which the mixture is left standing for some seven hours at about 60° C. At the end of this time, the NCO content of the prepolymer has fallen to around 3.2 percent, and the reaction is substantially over. The NCO/OH ratio is about 1.82. The viscosity of the solution rises from about 150 cp. immediately after preparation to about 745 cp. at the end of a twenty five week period. After forty five weeks' storage, the prepolymer begins to gel.

The increase in viscosity of the prepolymer with a 60 percent resin content is even greater since after only fifteen weeks' storage, its viscosity if around 3850 cp.

Comparison of products 1, 2 and 3 obtained by the process of the invention with the conventional one-component systems A and B (1) Quick drying.—Rapid drying is achieved for the products of this invention such as normally can only be obtained by using metal-containing or amine-containing drying catalysts. This is particularly advantageous since such additives are known to have a considerable negative effect upon both the processing properties and stability on storage of the lacquer.

DRYING TIME (IN MINUTES) [1]

|  | 1 | 2 | 3 | A | B |
|---|---|---|---|---|---|
| No catalyst | 100 | 80 | 60 | 200 | 250 |
| With 0.05 percent of dibutyltin dilaurate, based on the resin |  |  |  | 90 | 95 |

[1] Drying determined on glass plates with a 90μ thick wet film at 20° C./ 65 percent relative humidity.

The stability on storage of prepolymers A and B with and without a catalyst (0.05 percent of dibutyltin dilaurate based on solid binder) can be determined, for example, from the increase in viscosity as a function of time.

|  | A | | B | |
|---|---|---|---|---|
|  | Without | With | Without | With |
| Immediately after preparation | 35 | 45 | 150 | 202 |
| After 0.5 month | 45 | 50 | 250 | 410 |
| After 3 months | 47 | 55 | 340 | 675 |
| After 9 months | 48 | 57 | 755 | Gel |
| After 12 months | 80 | 135 | 760 |  |
| After 20 months | 87 | Gel | Gel |  |

(2) Quick hardening.—The products of this invention harden extremely quickly and have a quick initial hardness compared to other prepolymers prepared on a different basis.

|  | 1 | 2 | 3 | A | B |
|---|---|---|---|---|---|
| Hardness [1] after— |  |  |  |  |  |
| 1 day | 119 | 100 | 115 | 51 | 17 |
| 3 days | 130 | 157 | 132 | 100 | 72 |
| 7 days | 143 | 165 | 155 | 170 | 123 |
| 14 days | 150 | 175 | 160 | 178 | 136 |

[1] Albert-Konig's pendulum hardness according to DIN 53, 157.

(3) The hardening of the products of this invention is substantially unaffected by atmospheric moisture.

| Temp.,° C. | Moisture percent at relative humidity | Drying time | |
|---|---|---|---|
|  |  | 3 | A |
| 22 | 2 | 17 hrs |  |
| 22 | 35 | 75 min | 330 min. |
| 22 | 50 | 60 min | 240 min. |
| 22 | 92 | 50 min | 180 min. |

(4) The resistance to organic solvents of the products of this invention is achieved relatively quickly.

SOLVENT RESISTANCE[1]

|  | 1 | 2 | 3 | A | B |
|---|---|---|---|---|---|
| After 1 day | 0013 | 0013 | 0014 | 3333 | 3334 |
| After 2 days | 0013 | 0001 | 0004 | 0023 | 0034 |
| After 4 days | 0002 | 0000 | 0003 | 0003 | 0003 |
| After 7 days | 0000 | 0000 | 0000 | 0001 | 0011 |

[1] Tested after one minute's application of a wad of cotton-wool moistened with solvent.

NOTE.—3=superficially dissolved; 2=superficially swollen; 1=very slightly swollen; 0=unchanged. For each group of four numbers, the solvents used are, from left to right: toluene, butylacetate, ethylene glycol acetate and acetone.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

EXAMPLE 4

A mixture is prepared from 1391 parts by weight of a polyether alcohol (molecular weight 3300, OH number 50) prepared by propoxylation of 2-aminoethyl piperazine, 115 parts by weight of 1,3-dihydroxy butane, 395 parts by weight of trimethylol propane, 273 parts by weight of xylene and 273 parts by weight of ethyl glycol ether acetate.

To this mixture 1740 parts by weight of 2,4-diisocyanato toluene are added dropwise at 40° C.

After this addition of diisocyanato toluene the mixture is warmed during 3 hours to 50° C. The NCO/OH ratio including all isocyanate groups and all hydroxyl groups amounts to 1.58. The resin content of the lacquer solution obtained is 40% by weight. The NCO content of the solution is 3%, its viscosity is 320 cp. Lacquer films prepared from this solution have a drying time of 40 minutes at room temperature. The mechanical properties of such films are similar to the properties of the film obtained according to Example 3.

EXAMPLE 5

A mixture is prepared from 172 parts by weight of 1,3-dihydroxy butane, 348 parts by weight of 1,1,1-trimethylol propane and 1260 parts by weight of a polyether (molecular weight 2000, OH number 56) prepared by reaction of piperazine with 4% by weight of ethylene oxide and subsequently 96% by weight of propylene oxide, which percentages are based on the total amount of alkylene oxides.

This mixture is dissolved in 2640 parts by weight of ethyl glycol ether acetate. A solution of 1740 parts by weight of 2,4-diisocyanato toluene in 2640 parts by weight of xylene is added to above solution at such a rate that the temperature does not rise over 60° C.

The reaction mixture is finally stirred during 2 hours at 50° C. and subsequently during 1 hour at 80° C. The NCO/OH ratio including all isocyanate groups and all hydroxyl groups amounts to 1.57. The resin content of the lacquer solution thus obtained is 40% by weight, its NCO content is 3.4%, the viscosity is 590 cp.

The material dries at room temperature within 25 minutes to an elastic film. The pendulum hardness according to DIN 53,157 after 14 days is 147.

EXAMPLE 6

To a solution of 1546 parts by weight of 2,4-diisocyanato toluene in 2810 parts by weight of xylene and 2810 parts by weight of ethyl glycol ether acetate are added under stirring and cooling 1746 parts by weight of a polyether having the molecular weight of 3200 and the OH number 35 which was prepared by reacting alkyl amine with 3% by weight of ethylene oxide and subsequently with 97% by weight of propylene oxide which percentages are based on the total amount of alkylene oxides.

Finally, 351 parts by weight of trimethylol propane and 102 parts by weight of 1,3-butylene glycol are added dropwise to the reaction mixture at a temperature which does not exceed 60° C. The NCO/OH ratio including all isocyanate groups and all hydroxyl groups amounts to 1.59.

The resin content of the solution thus obtained is 40% by weight, the NCO content is 2.7%, the viscosity is 515 cp. Films prepared from the solution dry at room temperature within 1 hour. The pendulum hardness after 14 days according to DIN 53,157 is 130.

EXAMPLE 7

Following the procedure of Example 1 a lacquer solution was prepared starting from 2590 parts by weight of xylene, 2590 parts by weight of ethyl glycol ether acetate, 115 parts by weight of 1,3-butylene glycol, 395 parts by weight of trimethylol propane, 1211 parts by weight of a polyether having the OH number 58 which was prepared by propoxylation of a mixture of cyclohexyl diisopropanol amine and glycerol (OH percent ratio 84:16), 1740 parts by weight of 2,4-diisocyanato toluene. The NCO/OH-ratio including all isocyanate groups and all hydroxyl groups amounts to 1.58.

The lacquer solution obtained had a solid content of 40% by weight, an NCO content of 3.4% and a viscosity of 143 cp. Films prepared from this solution are dry after 110 minutes at room temperature. The pendulum hardness after 14 days according to DIN 53,157 is 150.

EXAMPLE 8

Example 1 is repeated with the only difference that 123 parts of 2,4-tolylene diisocyanate are used instead of 200 parts of 2,4-tolylene diisocyanate. The amount of solvent is reduced accordingly in order to obtain a solution having a solids content of 40 percent. The solution thus obtained has an NCO content of about 1.2 percent. The viscosity immediately after preparation of the lacquer solution is about 45 cp. at 20° C.

The solution is not storage-stable. After storage for 5 days a gel is obtained. Lacquer films prepared with this solution on a glass plate do not harden but remain tacky and have a strong tendency to swell when exposed to lacquer solvents such as those used in this example.

What is claimed is:

1. Storage-stable polyurethane isocyanates containing tertiary nitrogen atoms prepared by a process which comprises reacting an aromatic polyisocyanate free of urethane and allophanate groups with a polyether containing at least two hydroxyl groups and one tertiary nitrogen atom and having at least 5 ether groups between the tertiary nitrogen atom and the hydroxyl groups and a polyol which is free of nitrogen, at an NCO/OH ratio referring to the NCO groups of the aromatic polyisocyanate free of urethane and allophanate groups and to the hydroxyl groups of the polyether-containing tertiary nitrogen as well as to the hydroxy groups of the polyol which is free of nitrogen being at least 1.57.

2. The product of the process of claim 1 wherein the aromatic polyisocyanate, free of urethane and allophanate groups is prereacted with said polyol which is free of nitrogen to form a prepolymeric polyurethane or allophanate containing free isocyanate groups and having a molecular weight below about 1,000.

3. The product of the process of claim 1 wherein the polyether polyol contains three or more hydroxyl groups.

4. The product of the process of claim 1 wherein the reaction is carried out at a temperature from about 20° to about 120° C. in a polar organic solvent which is inert with respect to isocyanate groups.

References Cited

UNITED STATES PATENTS

| 2,901,467 | 8/1959 | Croco | 260—77.5 AQ |
| 3,255,253 | 6/1966 | Kuryla | 260—32.6 N |

MAURICE J. WELSH, Jr., Primary Examiner